(12) United States Patent
Rehmer et al.

(10) Patent No.: US 6,225,401 B1
(45) Date of Patent: May 1, 2001

(54) PRODUCTION OF HIGHLY CONCENTRATED ADHESIVE DISPERSIONS AND THEIR USE

(75) Inventors: Gerd Rehmer, Beindersheim; Bernd Stanger, Dudenhofen; Gerhard Auchter, Bad Dürkheim; Johannes Türk, Böhl-Iggelheim; Oral Aydin, Mannheim; Rüdiger Füssl, Neustadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/147,707
(22) PCT Filed: Aug. 21, 1997
(86) PCT No.: PCT/EP97/04553
  § 371 Date: Feb. 22, 1999
  § 102(e) Date: Feb. 22, 1999
(87) PCT Pub. No.: WO98/07767
  PCT Pub. Date: Feb. 26, 1998

(30) Foreign Application Priority Data

Aug. 22, 1996 (DE) ................................. 196 33 967

(51) Int. Cl.[7] .................................................. C08F 2/16
(52) U.S. Cl. .................... 524/800; 524/823; 524/215; 524/272; 526/80; 526/142; 526/307; 526/319
(58) Field of Search ................... 526/319, 307, 526/80, 142; 524/823, 272, 800, 215, 275

(56) References Cited

U.S. PATENT DOCUMENTS 4,322,516 * 3/1982 Wiest et al. .......................... 526/307
4,445,959 * 5/1984 Hombach et al. .................... 156/332
4,507,429 * 3/1985 Lenney ................................. 524/800
4,997,879 * 3/1991 Weissgerber et al. ................ 524/823
5,242,963 * 9/1993 Mao ..................................... 524/272
5,298,554   3/1994 Rehmer et al. .

FOREIGN PATENT DOCUMENTS 12 48 943   7/1965 (DE) .
40 20 767   6/1990 (DE) .

OTHER PUBLICATIONS

T.G. Fox, Bull. Am. Phys. Soc., (Ser.II), No. 1, p. 123, J5 "Influence of Diluent and of Copolymer Composition on the Glass Temperature of a Polymer System.", 1956.

J. Brandrup, et al., Polymer Handbook, $2^{nd}$ ed., 2 pages "Table of Contents", 1995.

H. Fickentscher, Cellulose Chemie, vol. 13, 1 page, 1932 (abstract only of pp. 56–64, 71 and 74).

* cited by examiner

Primary Examiner—David W. Wu
Assistant Examiner—Tanya Zalukaeva
(74) Attorney, Agent, or Firm—Oblon, Spivak, McClelland, Maier & Neustadt, P.C.

(57) ABSTRACT

Readily filterable and deodorizable aqueous dispersions of pressure-sensitive adhesive, especially for self-adhesive labels, having solids contents of more than 65%, can be prepared with readily reproducible properties by copolymerizing esters of acrylic and/or methacrylic acid in the presence of less than 50 ppm of inhibitor and, preferably, in the presence of from 0.01 to 5% by weight of reducing agent by a special emulsion technique. The highly concentrated pressure-sensitive adhesive dispersion, subsequently deodorized with steam, is free from coagulum and seediness.

15 Claims, No Drawings

PRODUCTION OF HIGHLY CONCENTRATED ADHESIVE DISPERSIONS AND THEIR USE

BACKGROUND OF THE INVENTION

1. Field of the Invention

The invention relates to processes for preparing filterable, deodorized, highly concentrated, aqueous dispersions of pressure-sensitive adhesive, based on copolymers of esters of acrylic and/or methacrylic acid, to products thus prepared and to their use.

2. Description of the Background

Polymer dispersions which are used in the adhesives industry for producing articles having contact adhesion are required to meet stringent quality criteria. Thus it must be possible to reproduce their properties within relatively narrow tolerances in order to enable them to be processed further without problems. In general, the processing of aqueous dispersions is more economic and more environment-friendly than that of systems which include organic solvents, since it does away with the need for complex equipment to recover the organic solvents. Highly concentrated aqueous dispersions of pressure-sensitive adhesive go a step further in terms of economy and environmental compatibility in that less water has to be evaporated in the course of their processing and, consequently, less energy is used than in the processing of aqueous dispersions having a lower polymer content. The transportation of highly concentrated dispersions, moreover, is more efficient than that of dispersions of lower concentration. For the processing of the aqueous polymer dispersions to form everyday products, the dispersions must be substantially free from volatile components. Volatile components are, in particular, unreactive monomers and saturated constituents in the monomers used, it being of course impossible to remove the latter by the polymerization reaction. To remove the volatile components, the polymer dispersions are treated—subsequent to their preparation—with steam (deodorization). For deodorization the polymer dispersions must be of sufficient stability, since otherwise the deodorization procedure is accompanied by the agglomeration of material and the formation of coagulum, reducing the solids content of the dispersions. This coagulation occurs with particular readiness in the case of highly concentrated polymer dispersions. Dispersions containing coagulum are not easy to filter, and before being used further as highly concentrated pressure-sensitive adhesive dispersions they require particularly laborious techniques for the removal of the coagulum.

There has been no lack of efforts to prepare highly concentrated aqueous polymer dispersions with solids contents or polymer contents of more than 65% by weight. For instance, EP-A 0 065 253 describes a process for preparing highly concentrated aqueous polyacrylate dispersions by the technique known as monomer emulsion feed polymerization, the resulting polymer dispersions being used for dressing leather. It is indicated that filterable polymer dispersions are obtained only when use is also made of a specific emulsifier, a dialkyl sulfosuccinate having 8 to 18 C atoms in the alkyls. However, there is great fluctuation in the properties of the resulting highly concentrated polymer dispersions, such as in their viscosities.

EP-B 0 037 923 likewise describes a process for preparing highly concentrated aqueous polyacrylate dispersions by the monomer emulsion feed polymerization technique, although the reproduction of the resulting dispersions does not meet the current quality requirements on account of the fact that marked fluctuations in properties occur here as well. Moreover, the highly concentrated aqueous polymer dispersions obtained are of only limited stability on deodorization. Furthermore, the process involves undesirable restrictions in terms of selection of monomers, content of minimum amounts of inhibitor, and the composition of the aqueous phase of the initial charge to the polymerization reactor, which are disadvantageous.

SUMMARY OF THE INVENTION

It is an object of the present invention to prepare filterable and deodorizable, highly concentrated, aqueous dispersions of pressure-sensitive adhesive with a highly reproducible set of properties by a process which does not have the disadvantageous restrictions of the prior art processes described above.

DETAILED DESCRIPTION OF THE PREFERRED EMBODIMENTS

We have found that this object can be achieved by a process for producing readily filterable and deodorizable, highly concentrated, aqueous dispersions of pressure-sensitive adhesive, having readily reproducible properties, on the basis of copolymers of esters of acrylic and/or methacrylic acid, the copolymers having glass transition temperatures of not more than 0° C., by emulsion polymerization in the presence of customary emulsifiers and free-radical polymerization initiators in accordance with the monomer emulsion feed polymerization technique, in which the monomer emulsion is run in a feed stream into the polymerization reactor, which comprises conducting the emulsion polymerization of a monomer mixture comprising (A) at least 50% by weight of the overall monomer amount of at least one ester of acrylic and/or methacrylic acid with alcohols of 1 to 18 C atoms and (B) other olefinically unsaturated monomers (comonomers)

a) in the presence of less than 50 ppm of polymerization inhibitor, based on the amount of monomers, by the monomer emulsion feed polymerization technique, such that b) the aqueous initial charge to the polymerization reactor is heated at from 30 to 110° C., and c) from 1 to 10% by weight of the amount of the monomer emulsion added in the feed stream is added to this initial charge over the course of ¼ to 1 hour from the beginning of the feed and at an increasing rate (amount per unit time), and d) then the remainder of the monomer emulsion is run in continuously and conventionally in accordance with the extent of polymerization of the monomers.

In accordance with the novel process, the preparation of the aqueous pressure-sensitive adhesive dispersions by emulsion polymerization of the monomers by the monomer emulsion feed polymerization technique takes place by initially charging an aqueous phase to the polymerization reactor, with or without the addition of auxiliaries, and then running in the monomer emulsion to be polymerized. The aqueous initial charge, which generally comprises from about 10 to 50 and, in particular, from 25 to 50% by weight of the overall amount of water of the initial charge plus the feed stream, preferably contains—in dissolved form before the beginning of the feed operation—at least one water-soluble salt, in particular in an amount of from about 1 to 7% by weight based on the initial charge. The salts, which in particular are inorganic salts, are usually polyelectrolytes as are also used as buffer substances, such as mixtures of primary, secondary and tertiary alkali metal phosphates or ammonium phosphates and, in particular, sodium pyrophosphate. Examples of other suitable salts are sodium chloride, sodium bicarbonate, calcium sulfate, magnesium phosphate, ammonium chloride and sodium sulfate. A suitable salt of an organic compound is the sodium salt of ethylenediaminetetraacetic acid. Before beginning the feed of the monomer emulsion, the aqueous initial charge is heated to a temperature in the range of, in general, from 30 to 110° C., in particular from 70 to 95° C.

The novel process takes place preferably in the presence of from 0.01 to 5 and, in particular, from 0.05 to 2% by weight, based on the amount of monomers, of a reducing agent, which can be added to the aqueous initial charge and/or to the monomer emulsion feed. The addition of the reducing agent to the initial charge (or to the emulsion feed) can be left out in some cases, especially when the target K values are relatively low. Suitable reducing agents are organic and inorganic compounds such as ascorbic acid, acetone bisulfite, reducing agents based on sulfinic acid, such as the sodium salt of hydroxymethanesulfinic acid, sodium bisulfite or complexed polyvalent metal ions, such as those of iron or of vanadium, for example iron(II) ammonium sulfate. Organic reducing agents, and especially ascorbic acid, are preferred. The K value, i.e. the molecular weight of the resulting emulsion polymer, can be established relatively easily by way of the choice of the amount—based on the overall monomer amount—of the reducing agent in the monomer emulsion feed stream.

In the polymerization reaction it is also possible to add regulators, especially in amounts of up to 0.5% by weight of the amount of monomers, which reduce the degree of polymerization of the resulting emulsion polymers. Examples of such regulators are mercaptans, such as tert-dodecyl mercaptan, ethylhexyl thioglycolate or 3-mercaptopropyltrimethoxysilane, or unsaturated compounds with allylic hydrogens, such as butenol.

Polymerization initiators which can be used for the novel process are organic and inorganic free-radical initiators which are customary for an emulsion polymerization, in customary amounts; they are added at the beginning or are metered into the reactor during the feed of the monomer emulsion. The initiators can be present in the polymerization reactor right from the start or when the aqueous initial charge is heated. More judiciously, the initiators are not added to the aqueous initial charge until it has reached the desired reaction temperature of from 30 to 110° C., in particular from 70 to 95° C. The addition of the polymerization initiator to the reactor can also be made together with the addition of the monomer emulsion, at intervals or continuously. Preferred polymerization initiators are those which are soluble in water, such as the peroxodisulfates of sodium, of ammonium and/or of potassium, and redox initiators, such as mixtures of, for example, peroxodisulfates or hydrogen peroxide with reducing agents such as sodium hydrogen sulfite, ascorbic acid or the sodium salt of hydroxymethanesulfic acid (HOH$_2$C—SO$_2$Na) (Rongalit® C from BASF). Particularly suitable emulsifiers are customary anionic emulsifiers in customary amounts, for example in an amount of from 0.5 to 3% by weight of the amount of monomers. Suitable emulsifiers are sodium lauryl sulfate, sodium alkylsulfonates having 11 to 17 C atoms in the alkyl, sodium alkylarylsulfonates having 8 to 12 C atoms in the alkyl, the sodium salts of sulfuric esters of alkylphenols, having 8 to 12 C atoms in the alkyl, ethoxylated with from 5 to 30 mol of ethylene oxide, and the sodium salts of sulfates of alcohols, having 8 to 18 C atoms, ethoxylated with from 10 to 20 mol of ethylene oxide. At the same time it is additionally possible to use nonionic emulsifiers, in particular in an amount of from 0 to 2% by weight of the amount of monomers, examples being ethoxylated long-chain alcohols or ethoxylated alkylphenols having 8 to 12 C atoms in the alkyl.

In contrast to the process described in EP-B 0 037 923 (column 1, lines 43–46) it is not necessary for an anionic emulsifier to be present in the aqueous initial charge, which would be a disadvantage in the case of the novel process since then relatively highly viscose dispersions would be obtained. In the novel process, therefore, it is preferably only the monomer emulsion feed which comprises the anionic emulsifiers, whereas the aqueous initial charge contains no anionic emulsifiers.

A further advantageous contrast to the process described in EP-B 0 037 923 is the differing content of polymerization inhibitors in the monomer emulsion feeds. In the prior art process, the monomer emulsion is required to contain from 50 to 500 ppm, based on the amount of monomer, of polymerization inhibitor; in other words, polymerization inhibitor must be added in a relatively large amount. In the case of the novel process, the monomer emulsion can comprise less than 50 ppm of polymerization inhibitor. Polymerization inhibitors, for example hydroquinone, hydroquinone monomethyl ether, tert-butylpyrocatechol or phenothiazine are added to the monomers, as is known, in order to prevent unwanted polymerization during the storage of the monomers. The polymerization inhibitor content of the monomers is generally from 10 to almost 50 ppm; in other words, no separate addition of inhibitor is required for the novel process. It was surprising that, under these conditions, highly concentrated polymer dispersions can be obtained having solids contents of more than 65% by weight and, in particular, more than 68% by weight.

In accordance with the novel process, the monomer mixtures used for the emulsion polymerization comprise at least 50%—in terms of the weight of the overall monomer amount—of esters of acrylic and/or methacrylic acid with alcohols having 1 to 18 and, in particular, 2 to 10 C atoms. The nature and amount of the monomers and comonomers are selected so as to ensure that the resulting copolymers have glass transition temperatures $T_g$ of not more than 0° C. and, in particular, from −60 to ±0° C., and that their adhesion and tack are suitable for use as aqueous pressure-sensitive adhesive dispersions. For this utility, the possible comonomers can often be used only in limited amounts or quantitative ranges.

For achieving the desired glass transition temperatures $T_g$ by selecting appropriate types and amounts of monomers it is useful to refer to the formula of Fox (T. G. Fox, Bull.Amer.Physic.Soc. (Ser.II) 1, (1956), 123), which holds that, for the glass transition temperature $T_g$ of copolymers, it is true in good approximation that:

$$\frac{1}{T_g} = \frac{x^1}{T_g^1} + \frac{x^2}{T_g^2} + \cdots + \frac{x^s}{T_g^s}$$

where $X^1, X^2 \ldots X^S$ are the mass fractions of the monomers and $T_g^1, T_g^2 \ldots T_g^S$ are the glass transition temperatures, in kelvins, of each of the homopolymers formed from only one of the monomers 1, 2 . . . S.

The glass transition temperatures of the homopolymers of customary monomers are known and are listed, for example, in J. Brandrup and E. H. Immergut, Polymer Handbook, 2nd Edition, J. Wiley Verlag, New York 1995.

Preferred copolymers for use as pressure-sensitive adhesives, furthermore, have a K value of from 50 to 130, in particular from 80 to 120 and, with particular preference, from 90 to 110, the K value (in accordance with H. Fikentscher, Cellulosechemie 13, (1932), 58–60) characterizing the mean molecular weight. The K value is a relative viscosity number which is determined in accordance with DIN 53 726 and comprises the flow rate of a 1% strength by weight solution of the copolymer in tetrahydrofuran relative to the flow rate of pure tetrahydrofuran. The K value can be adjusted by way of the nature and amount of the regulators and reducing agents that are present during the copolymerization.

Examples of esters of acrylic and/or methacrylic acid with straight-chain and branched-chain alcohols (preferably alkanols) having 1 to 18 and, in particular, 2 to 10 C atoms are the esters with methanol, ethanol, propanol, isopropanol, n-butanol, isoamyl alcohol, 2-ethylhexanol and isooctanol.

Suitable hardening ("hard") comonomers are olefinically unsaturated carboxylic acids having 3 to 5 C atoms, vinylsulfonic acid and noncrosslinking anhydrides, amides, imides and salts of these acids, alone or as a mixture with one another, such as acrylic acid, methacrylic acid, maleic acid, maleic anhydride, fumaric acid, crotonic acid, itaconic acid, vinylsulfonic acid, sodium vinylsulfonate, sodium acrylate, acrylamide, methacrylamide, N-methylolacrylamide, N-methylolmethacrylamide, acrylamidoglycolic acid, etc. These comonomers are used in particular in amounts of in each case from 0.01 to 5% by weight and, in particular, from 0.1 to 2% by weight, based on the overall monomer amount. Particular preference is given to the use of acrylic acid as a comonomer in the stated amounts and, preferably, in an amount of from 0.2 to 1% by weight, based on the overall monomer amount. N-Methylolacrylamide and N-methylolmethacrylamide are preferably used in an amount of up to 2.5% by weight of the overall monomer amount.

Other suitable hardening comonomers are vinylaromatic compounds having 8 to 12 C atoms, such as styrene, c-methylstyrene, o- and p-methylstyrene, acrylonitrile, methacrylonitrile, methyl methacrylate and also vinyl esters of carboxylic acids having 1 to 20 C atoms, such as vinyl acetate, vinyl propionate, vinyl laurate, vinyl stearate or vinyl esters of Versatic® acids (saturated carboxylic acids having relatively long side chains and tertiary COOR groups, prepared from olefins, carbon monoxide and water). The comonomers mentioned in the preceding sentence are generally used in amounts of from 0.01 to 15% by weight of the overall monomer amount. However, the vinyl esters can be used in an amount of up to 20% by weight, styrene is used, in particular, in an amount of from 0.01 to 7.5 and, preferably from 0.5 to 3% by weight, vinyl acetate preferably in an amount of from 1.0 to 10% by weight and acrylonitrile and methacrylonitrile preferably in an amount of up to 7.5% by weight, all of these % by weight being based on the overall monomer amount. Also of importance as comonomers for the preparation of aqueous dispersions of pressure-sensitive adhesive are esters of acrylic and/or methacrylic acid with polyhydric alcohols, especially glycols, such as 2-hydroxyethyl or 2-hydroxypropyl acrylate, which are used in amounts of up to 15, in particular from 0.01 to 10 and, with particular preference, from 0.1 to 7.5% by weight of the overall monomer amount. Other comonomers which may be mentioned, finally, are N-vinylpyrrolidone and vinyl ethers, such as vinyl methyl ether or vinyl n-butyl ether.

For preparing highly concentrated dispersions, these monomers can be combined with one another as desired provided they meet the requirements for the resulting copolymer in terms of its properties for use as a pressure-sensitive adhesive. According to EP-B 0 037 923 (column 1, lines 36 to 41), the preparation of highly concentrated aqueous copolymer dispersions is tied to particular conditions for the selection of the monomers: only by combining monomers which do not copolymerize with one another per se (such as styrene and vinyl acetate) is it possible to achieve copolymer dispersions of high solids content. These restrictions on the selection of monomers do not apply to the novel process, which is therefore much broader in its scope for application.

In accordance with the novel process, polymerization is conducted in general at from 30 to 110° C., preferably from 70 to 95° C. Polymerization can be commenced under a slightly subatmospheric pressure, from about 200 mbar, and conducted under a superatmospheric pressure of up to about 10 bar. The monomer emulsion and the initiator feed stream can be supplied either to the dome of the reactor, onto the stirred reaction mixture, or through the base of the reactor into the stirred reaction mixture, the latter feed technique, from below, being preferred. A feed technique of this kind is described for solution polymerization, for example, in DE-C 40 20 767.

The feed streams of the polymerization initiator of the monomer emulsion can be supplied separately to the polymerization reactor. However, in a preferred embodiment they can also be mixed with one another prior to entering the reactor. This mixing can be done by static or dynamic mixers. The initiator solution can either be supplied to the reactor vessel within the same period of time as the monomer emulsion or else can be ended before (for example ½ h before) the end of the feed of the monomer emulsion or else, for example, not until ½ to 1 hour after the end of the monomer emulsion feed. Preference is given to the concurrent supply of monomer emulsion and initiator solution to the polymerization reactor, in particular in a procedure in which the inlet ports for the feed streams are in the dome of the reactor.

The feed of the monomer emulsion is begun by running from 1 to 10% by weight of the monomer emulsion into the initial charge over a period of from ¼ to 1 hour from the beginning of the feed, at an increasing rate (amount per unit time). It is possible here to begin with a feed rate of just a few liters per hour, for example from 30 to 60 liters per hour, and then to raise this rate sharply, for example to a multiple, in particular from 3 to 10 times the initial feed rate, over the course of the following ¾ hour.

After this initial period, the major proportion of the monomer emulsion is then run into the polymerization reactor in a customary manner, at short intervals or continuously, an important co-determinant of the feed rate being the rate of polymerization of the infed monomers in the reactor.

After the end of the monomer feed, the degree of polymerization—which is already high—can be brought to completion by subjecting the dispersions prepared by the novel process to postpolymerization. This is done, after the end of the feed of the monomer emulsion and at from 30 to about 90° C., by adding polymerization initiators and, preferably, reducing agents as well to the dispersion. Such combinations of a polymerization initiator with a reducing agent are, in particular, tert-butyl hydroperoxide/sodium bisulfite, tert-butyl hydroperoxide/acetone bisulfite, and hydrogen peroxide/ascorbic acid, possibly in combination with polyvalent metal ions, such as complexed iron(II) salts. Preference is given to postpolymerization media which do not increase the concentration of inorganic salts in the aqueous phase of the dispersion.

The novel highly concentrated aqueous copolymer dispersions are subjected if desired to (physical) deodorization, in particular by treatment with steam; in other words, the dispersion of pressure-sensitive adhesive is deodorized by passing steam through it and removing volatile components, which often give rise to an unwanted odor in the dispersion and which may also be toxic. A deodorization technique of this kind is described, for example, in DE-C 12 48 943. The dispersion can also be deodorized by additionally passing air or gas, for example nitrogen, through nozzles and into the dispersion. Deodorization of the dispersion is generally carried out at from 50 to 110° C., preferably from 65 to 90° C. The deodorization process used, which is known per se for polymer dispersions, can be discontinuous or continuous. It is surprising that the highly concentrated copolymer dispersions prepared in accordance with the invention, with solids contents of more than 65% by weight, are stable to deodorization, i.e. can be deodorized without substantial coagulation. This is a very particular advantage in the use of the highly concentrated copolymer dispersions as pressure-sensitive adhesives, especially for self-adhesive labels, such as paper labels, for which a further requirement is high shear strength of the resin-modified copolymer dispersions.

The Examples and Comparison Experiments below are intended to illustrate the process of the invention in more detail but without restricting it.

The stated viscosities (mPas) were determined by the Brookfield method in accordance with ISO 2555 using a rotary viscometer.

The coagulum contents indicated were found by determining the sieve residue by a modification of DIN 53786 in which 1 kg of each copolymer dispersion was filtered through a sieve with a mesh size of 0.125 mm. The sieve residue was washed with distilled water, then dried and weighed. The figure given is a percentage based on the copolymer dispersion.

In order to assess the seediness, polyester films are knife-coated with the respective copolymer dispersion in an amount of 19–21 g/m$^2$. The films are dried at room temperature in a dust-free atmosphere. Then the seediness is assessed under opposing light on a scale of ratings from 1 (very good, no seediness) to 5 (very poor, severe seediness).

To assess the contact adhesion properties, the shear strength (resin-modified) was tested, a property which is of importance for the technical evaluation of pressure-sensitive adhesives for self-adhesive labels, especially paper labels. For the test, a test strip is produced. The polymer dispersion to be tested is blended in a ratio of 7/3 (based on solids) with a customary commercial aqueous rosin ester dispersion. The blend is then applied in a thin layer using a doctor blade to siliconized paper and dried, the gap width of the doctor blade being chosen so as to give a dry adhesive film of 19–21 g/m$^2$. Commercial white label paper is placed onto the layer of dried adhesive and is rolled on firmly using a manual roller. The resulting label laminate is cut into strips 0.5 inch (12.7 mm) wide, and the strips are stored prior to testing for at least 24 hours at 23° C. and 50% relative atmospheric humidity.

The shear strength is tested in accordance with FINAT FTM 7: After pulling off the siliconized paper, the label test strip is bonded to the edge of a stainless steel sheet so as to give a bond area of 0.5 inch×0.5. inch (12.7 mm×12.7 mm). 20 minutes after bonding, a 500 g weight is fastened to the protruding end of the strip of paper, and the metal sheet is suspended vertically at 23° C. and 50% relative atmospheric humidity. The shear strength is taken as the time, in minutes, until failure of the adhesive bond under the effect of the weight, as a mean from the results of 3 test specimens.

The glass transition temperatures were determined by the DSC method in accordance with ASTM 3418/82.

EXAMPLE 1

In a pressure-resistant, stirrable reactor an aqueous initial charge comprising 63.5 l of demineralized water, 22.4 l of a 3% strength aqueous tetrasodium pyrophosphate solution, 0.34 kg of ascorbic acid and 13.1 l of a 7% strength aqueous sodium persulfate solution was heated to 80° C. Over the course of 4 hours a monomer emulsion prepared from 74.9 l of water, 18.3 l of a 35% strength aqueous solution of the sodium salt of the sulfuric ester of isooctylphenol ethoxylated with 25 mol of ethylene oxide, 4.5 l of a 25% strength aqueous solution of sodium vinylsulfonate, 13.4 l of a 20% strength aqueous solution of sodium lauryl sulfate, 12.2 l of 10% strength aqueous sodium hydroxide solution, 15.2 l of styrene, 57.0 l of methyl methacrylate, 59.1 l of vinyl acetate, 609.7 l of 2-ethylhexyl acrylate and 3.4 l of acrylic acid (amount of inhibitor <50 ppm) was added to the reactor. At the beginning, the feed rate was 46.36 l/h for 6 minutes and was then increased to 231.8 l/h at a uniform rate over the course of 40 minutes. Starting from the beginning of the monomer emulsion feed, 52.4 l of an aqueous solution of sodium peroxodisulfate were added over the course of 5 hours, and the polymerization reactor was maintained at 85 to 87° C.

At the end of polymerization, at about 70° C., 7 l of a 10% strength solution of tert-butyl hydroperoxide and, simultaneously, a solution of 0.69 kg of sodium bisulfite, 0.43 kg of acetone and 11.1 l of water were added over the course of one hour.

A coagulum-free and nonseedy copolymer dispersion was obtained having a K value of 85 and a solids content of 70.3%. The glass transition temperature of the copolymer was −40° C.

Steam is passed through the resulting dispersion, with stirring, for about 3 hours in a vessel, the highly concentrated, stirred copolymer dispersion being maintained at about 70° C. The steam was then passed through condensers in order to separate volatile components. The entrained aqueous dispersion was separated in these condensers and was passed back to the reaction vessel. The deodorized aqueous copolymer dispersion was low in coagulum, contained little seediness and was readily filterable. The values measured are shown in Table 1.

COMPARISON EXAMPLE 1

A coagulum-free and nonseedy copolymer dispersion with a concentration of 70% strength was prepared as in Example 1 of EP-B 0 037 923. It was deodorized in exactly the same way as in Example 1 above by passing steam through it. The resulting deodorized highly concentrated aqueous copolymer dispersion had a high coagulum content and was difficult to filter. The values obtained are shown in Table 1.

TABLE 1

Properties of the deodorized dispersions

| Dispersion of | Example 1 | Comparison Experiment 1 |
| --- | --- | --- |
| Coagulum content | 0.014% | 0.953% |
| Seediness | 2 | 5 |
| Filterability | good | very poor |

EXAMPLE 2

The procedure of Example 1 was repeated but a solution of 0.34 kg of ascorbic acid and 11.1 l of water was placed in the monomer emulsion feed during the 4-hour feed time. A coagulum-free and nonseedy aqueous copolymer dispersion was obtained with a solids content of 71%. The measured values for viscosity, K and shear strength (resin-modified) are shown in Table 2. The dispersion was deodorized as indicated in Example 1 to give a dispersion of pressure-sensitive adhesive low in coagulum and with little seediness.

EXAMPLES 3 TO 6

The exact procedure of Example 2 was repeated, i.e. Example 2 was repeated 4 times in order to test the reproducibility of the properties of the novel products. The values indicated in Table 2 for viscosity, x and shear strength (resin-modified) show that the properties of the products of the novel process can be reproduced with narrow tolerances.

TABLE 2

Reproducibility of product properties

| Example | Viscosity (mPas) | K value | Shear strength (min.) |
| --- | --- | --- | --- |
| 2 | 760 | 93.4 | 40 |
| 3 | 708 | 94.1 | 35 |
| 4 | 695 | 95 | 45 |
| 5 | 666 | 93 | 41 |
| 6 | 680 | 94 | 45 |

COMPARISON EXAMPLES 2 TO 4

Precisely as indicated in Example 7 of EP-B 0037923 a highly concentrated copolymer dispersion was prepared and its solids content was adjusted with deionized water to 69.5%. This preparation of the dispersion was repeated twice (Comparison Experiments 3 and 4), and the viscosity and shear strength (resin-modified) were measured for all 3 products. The values are shown in Table 3. They indicate that the viscosity is considerably higher and subject to marked fluctuation.

TABLE 3

Reproducibility of product properties (Comparison processes)

| Comparison experiment | Viscosity (mPas) | Shear strength (min.) |
| --- | --- | --- |
| 2 | 1350 | 14.5 |
| 3 | 1050 | 15.4 |
| 4 | 1590 | 12.5 |

EXAMPLE 4

The exact procedure of Example 1 was repeated but replacing the 59.1 l of vinyl acetate by the same amount of methyl methacrylate. An aqueous, deodorization-stable dispersion of pressure-sensitive adhesive was obtained with a solids content of 70.6% and a coagulum content of 0.008%.

What is claimed is:

1. A process for preparing highly concentrated, aqueous dispersions of pressure-sensitive adhesive based on copolymers of esters of acrylic or methacrylic acid or both, the copolymers having glass transition temperatures of not more than 0° C., by emulsion polymerization in the presence of an emulsifier and free-radical polymerization initiator by a monomer emulsion feed polymerization wherein the monomer emulsion is run in a feed stream into a polymerization reactor, which comprises emulsion polymerizing a monomer mixture comprising (A) at least 50% by weight of total monomer amount of at least one ester of acrylic or methacrylic acid or both with alcohols of 1 to 18 carbon atoms and (B) other olefinically unsaturated monomers:

a) in the presence of less than 50 ppm of polymerization inhibitor, based on the amount of monomers, by the emulsion feed method, and wherein b) an aqueous initial charge to the polymerization reactor not containing said monomer emulsion is heated at from about 30 to 110° C.; and c) from about 1 to 10% by weight of the total amount of the monomer emulsion in the feed stream is added to this initial charge over the course of about ¼ to 1 hour from the beginning of the feed and at an increasing rate of amount per unit time; and then d) the remainder of the monomer emulsion is introduced into the polymerization reactor to complete polymerization of the monomers.

2. The process of claim 1, wherein the emulsion polymerization of the monomer mixture is carried out effected in the presence of from about 0.01 to 5% by weight, based on the amount of monomers, of a reducing agent.

3. The process of claim 1, wherein, after the end of the feed of the monomer emulsion and before a deodorization, postpolymerization is carried out at from about 30 to 90° C. with the addition of polymerization initiator and reducing agent.

4. The process of claim 1, wherein the emulsion polymerization is carried out in the presence of from about 0.01 to 5% by weight of an organic reducing agent.

5. The process of claim 4, wherein ascorbic acid is used as organic reducing agent.

6. The process of claim 1, wherein the aqueous initial charge in the polymerization reactor, prior to the feed of the monomer emulsion, contains no anionic emulsifier.

7. The process of claim 1, wherein the aqueous initial charge in the polymerization reactor, prior to the feed of the monomer emulsion, contains from about 1 to 7% by weight, based on the amount of the aqueous initial charge, of at least one water-soluble salt.

8. The process of claim 1, wherein the monomer mixture used comprises monomers all of which copolymerize with one another.

9. The process of claim 1, wherein olefinically unsaturated carboxylic acids having 3 to 5 C atoms, vinylsulfonic acid or noncrosslinking anhydrides, amides, imides or salts of these acids or a mixture of the above are also used as hardening olefinically unsaturated comonomers (B), in an amount of from about 0.01 to 5% by weight of the overall monomer amount.

10. The process of claim 1, wherein methyl methacrylate, acrylonitrile, styrene, α-methylstyrene or vinyl acetate in amounts of from 0.01 to 15% by weight of the overall monomer amount are used as hardening olefinically unsaturated comonomers (B).

11. The process of claim 1, wherein the resulting, highly concentrated, aqueous dispersions of pressure-sensitive adhesive have a solids content of more than 65% by weight.

12. The process of claim 1, wherein the polymers in the resulting, highly concentrated, aqueous dispersions of pressure-sensitive adhesive have glass transition temperatures of from −60° C. to ±0° C.

13. The process of claim 1, wherein after the end of the emulsion polymerization one resulting, highly concentrated, aqueous dispersion of pressure-sensitive adhesive is deodorized by passing steam through it.

14. A highly concentrated, aqueous dispersion of pressure-sensitive adhesive based on copolymers of esters of acrylic or methacrylic acid or both, wherein the copolymer has a glass transition temperature of not more than 0° C. obtained by the process of claim 1.

15. Self-adhesive labels prepared by applying the aqueous dispersion of pressure-sensitive adhesive as defined in claim 14.

* * * * *

UNITED STATES PATENT AND TRADEMARK OFFICE
CERTIFICATE OF CORRECTION

PATENT NO.    : 6,225,401 B1
DATED         : May 1, 2001
INVENTOR(S)   : Rehmer et al.

Page 1 of 1

It is certified that error appears in the above-identified patent and that said Letters Patent is hereby corrected as shown below:

Title page,
Under Item [56] entitled "OTHER PUBLICATIONS" "H. Fickentscher" should read -- H. Fikentscher --.

Column 5,
Line 39, "c-methylstyrene" should read -- α-methylstyrene --.
Line 44, "tertiary COOR" should read -- tertiary COOH --.

Column 9,
Line 28, "x and shear strength" should read -- K and shear strength --.

Column 10,
Line 35, after "carried out" delete "effected".

Signed and Sealed this

Twenty-eighth Day of May, 2002

Attest:

Attesting Officer

JAMES E. ROGAN
Director of the United States Patent and Trademark Office